(12) United States Patent
Connor et al.

(10) Patent No.: US 7,217,361 B2
(45) Date of Patent: May 15, 2007

(54) FILTER WITH SUPPORT COLUMNS

(75) Inventors: Michael J. Connor, Stoughton, WI (US); Rebecca Beier, Milwaukee, WI (US); Jessie Alan Knight, Stoughton, WI (US); Michael E. Yost, Tiffin, OH (US); Edwin A. Castellanos, Findlay, OH (US); Gary L. Rickle, Wharton, OH (US)

(73) Assignee: Fleetguard, Inc., Nashville, TN (US)

( * ) Notice: Subject to any disclaimer, the term of this patent is extended or adjusted under 35 U.S.C. 154(b) by 315 days.

(21) Appl. No.: 10/629,433

(22) Filed: Jul. 29, 2003

(65) Prior Publication Data

US 2005/0023210 A1  Feb. 3, 2005

(51) Int. Cl.
*F02M 35/04* (2006.01)

(52) U.S. Cl. ............... 210/232; 210/455; 210/497.01; 123/198 E; 55/510

(58) Field of Classification Search .......... 210/438, 210/439, 440, 442, 443, 446, 450, 453, 455, 210/232, 238, 497, 497.01; 55/385.3, 510, 55/502; 123/198 E
See application file for complete search history.

(56) References Cited

U.S. PATENT DOCUMENTS

| 1,861,805 | A | * | 6/1932 | Lentz ..................... 210/440 |
| 3,280,541 | A | | 10/1966 | Soltis |
| 3,524,550 | A | * | 8/1970 | Grant et al. ............... 210/232 |
| 3,578,014 | A | * | 5/1971 | Gachot .................. 137/115.15 |
| 3,898,066 | A | * | 8/1975 | Miskiewicz .................. 55/317 |
| 4,211,543 | A | | 7/1980 | Tokar et al. |
| 4,314,832 | A | | 2/1982 | Fox |
| 4,331,535 | A | * | 5/1982 | Pett ............................. 210/85 |
| 4,871,381 | A | * | 10/1989 | Smith ........................ 55/385.3 |
| 5,053,129 | A | * | 10/1991 | Kitson ........................ 210/232 |
| 5,100,443 | A | | 3/1992 | Berto |
| 5,484,527 | A | * | 1/1996 | Janik et al. ................. 210/232 |
| 5,753,120 | A | * | 5/1998 | Clausen et al. ............. 210/438 |
| 5,895,510 | A | | 4/1999 | Butler et al. |
| 6,235,073 | B1 | | 5/2001 | Bannister et al. |

FOREIGN PATENT DOCUMENTS

| GB | 2079178 A | * | 1/1982 |
| GB | 2084256 A | | 4/1982 |

* cited by examiner

*Primary Examiner*—Terry K. Cecil
(74) *Attorney, Agent, or Firm*—Andrus, Sceales, Starke & Sawall, LLP; J. Bruce Schelkopf

(57) ABSTRACT

A filter includes first and second axially spaced end caps having filter media extending axially between the end caps and extending in a closed-loop around a perimeter defining a hollow interior communicating with an axial flow opening through one of the end caps. One or more columns extend axially in the hollow interior between the end caps and are laterally spaced from the axial flow opening and have hollow sub-interiors for receiving one or more posts extending axially thereinto from a base for mounting the filter to the base in axial compression and with a wiper seal.

5 Claims, 3 Drawing Sheets

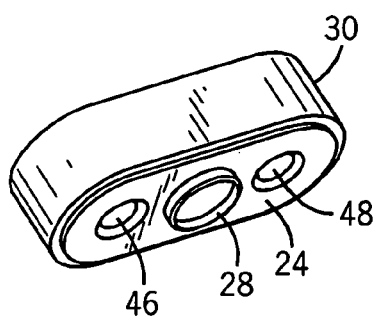
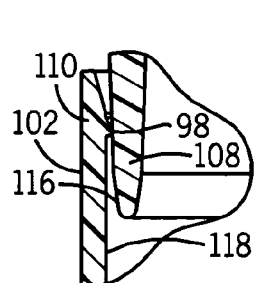
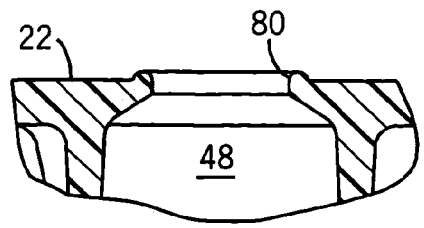
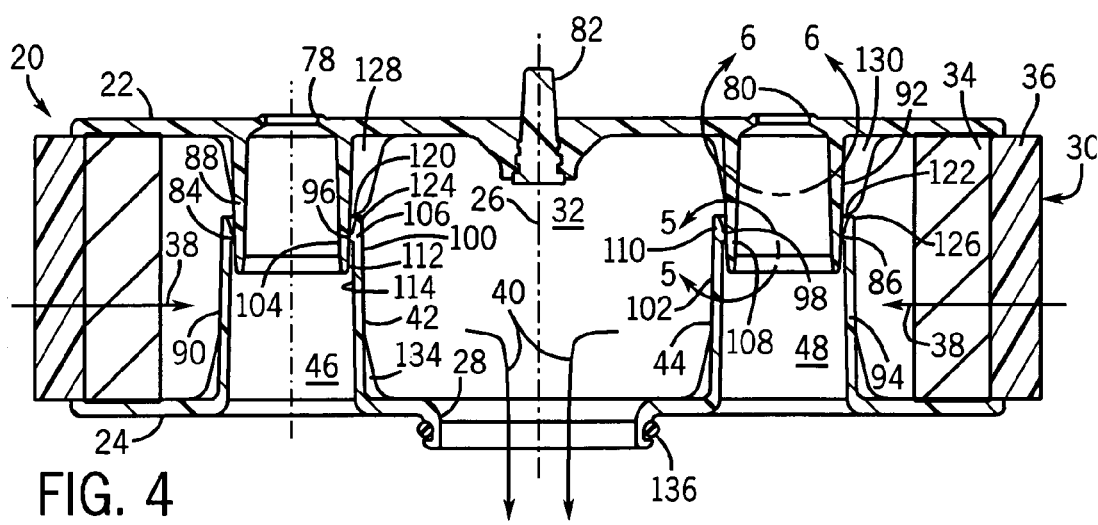
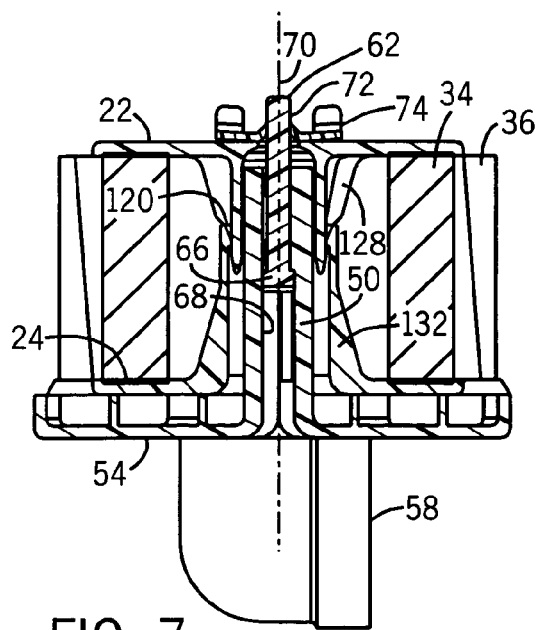
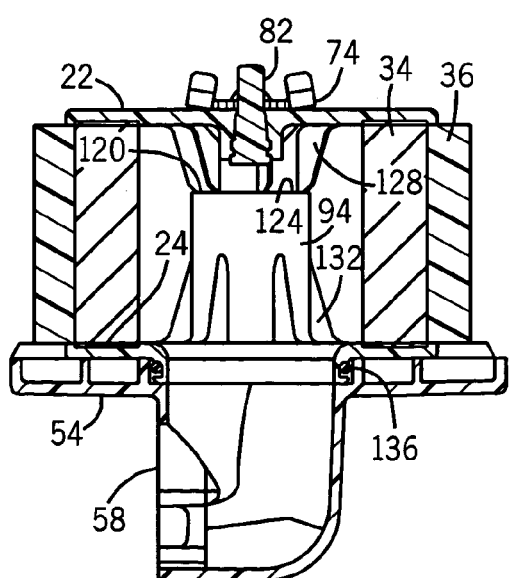

FILTER WITH SUPPORT COLUMNS

BACKGROUND AND SUMMARY

The invention relates to filters, including air filters, and more particularly to a simplified cost-advantaged construction including axial force-bearing structure.

Filters including air filters are known in the prior art and typically have first and second axially spaced end caps, and filter media extending axially between the end caps and extending in a closed-loop around a perimeter defining a hollow interior communicating with an axial flow opening through one of the end caps. For mounting and/or sealing purposes, various applications use axial compression force between the end caps and/or between the filter element assembly and a mounting base.

The present invention provides simple and effective structure in the noted axial mounting configuration, including the application of axial compression force between the end caps.

BRIEF DESCRIPTION OF THE DRAWINGS

FIG. 3 is a perspective bottom view of a component of FIG. 2.

FIG. 4 is a sectional view taken along line 4—4 of FIG. 2.

FIG. 5 is an enlarged view of a portion of FIG. 4 as shown at section 5.

FIG. 6 is an enlarged view of a portion of FIG. 4 as shown at section 6.

FIG. 7 is a sectional view taken along line 7—7 of FIG. 1.

FIG. 8 is a sectional view taken along line 8—8 of FIG. 1.

DETAILED DESCRIPTION

Figure 1:
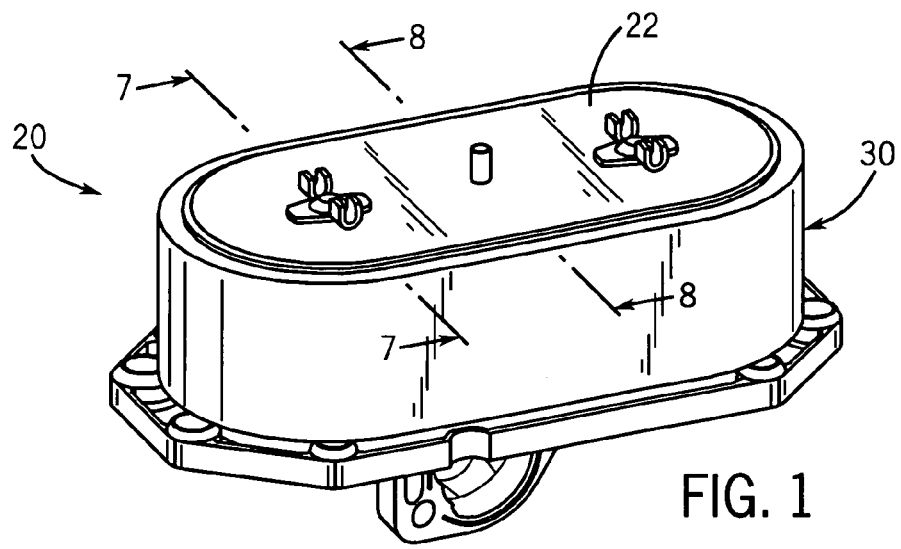
FIG. 1 is an assembled perspective view of a filter in accordance with the invention.
Figure 2:
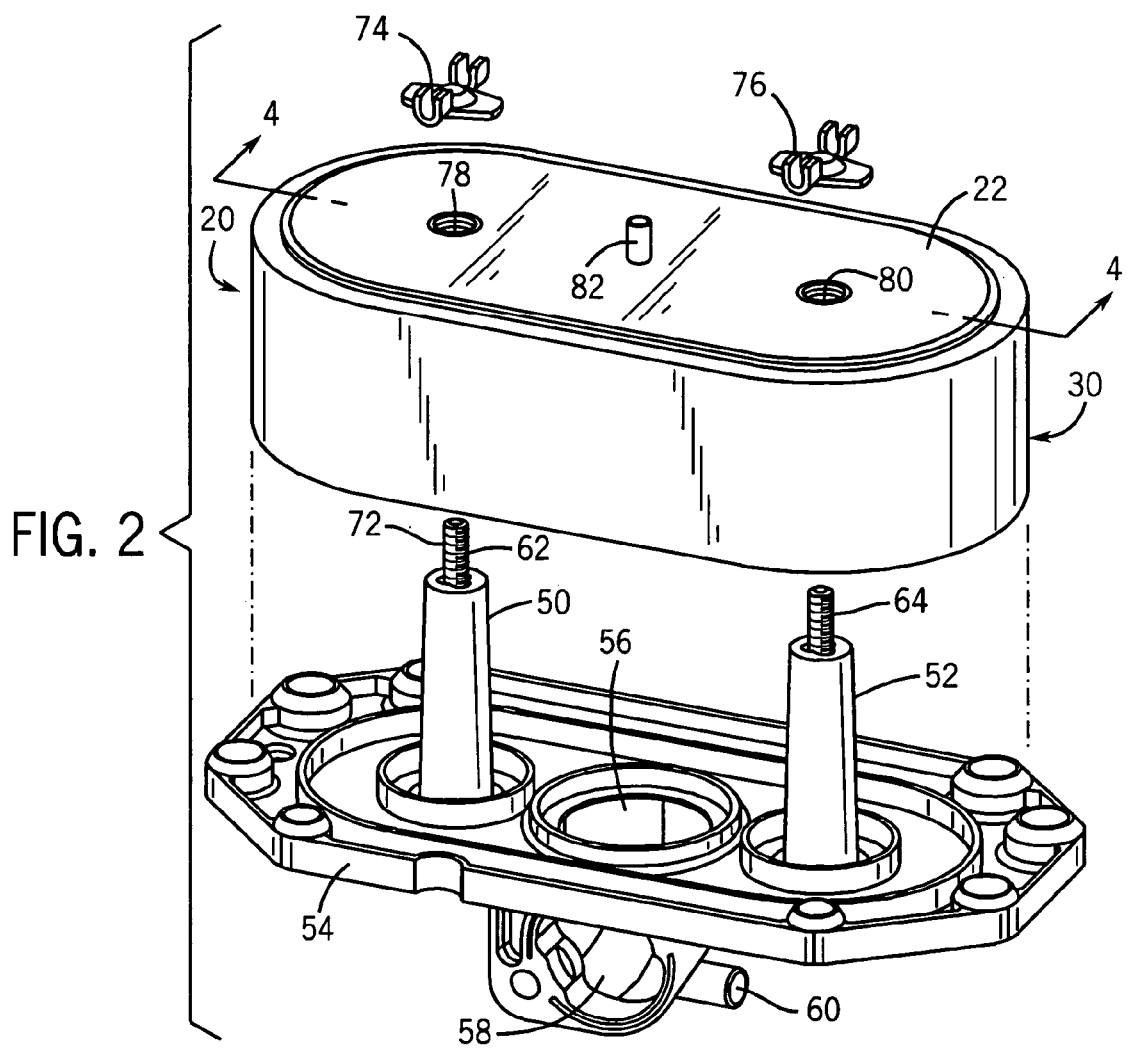
FIG. 2 is an exploded perspective view of the filter of FIG. 1.

FIGS. 1 and 2 show a filter 20 having first and second end caps 22 and 24, FIGS. 3, 4, axially spaced along axis 26. End cap 24 has an axial flow opening 28 therethrough. Filter media 30 extends axially between end caps 22 and 24 and extends in a closed-loop around a perimeter, e.g. racetrack-shaped as shown, or other shapes such as circular, oval, rectangular, etc., defining a hollow interior 32 communicating with axial flow opening 28. The filter media shown includes a pleated layer 34 and an outer foam wrap 36 in the embodiment shown, and may alternately be provided by other types of single or multiple layer media. End caps 22 and 24 are preferably plastic, and the filter media is preferably embedded therein, as is known. Fluid to be filtered flows laterally as shown at arrows 38 in FIG. 4 through the filter media and axially as shown at arrows 40 through hollow interior 32 and axial flow opening 28. In the preferred embodiment, the filter is an air filter, and dirty air flows laterally inwardly through filter media 30 into hollow interior 32 as clean air and then flows axially through axial flow opening 28.

A pair of columns 42 and 44, FIG. 4, extend axially in hollow interior 32 between end caps 22 and 24 and are laterally spaced from axial flow opening 28 on laterally distally opposite sides thereof. Each column has a hollow sub-interior 46 and 48, respectively, for receiving a respective post 50 and 52, FIGS. 2, 7, extending axially thereinto from a base 54 for mounting the filter to the base. The posts apply axial compression force between the end caps on laterally distally opposite sides of flow opening 28, and the columns support the axial compression force on laterally distally opposite sides of axial flow opening 28, to be described. The axial compression force is supported without the need for inner and outer filter media liners, and in preferred form such liners are eliminated in the present construction.

Base 54 is mounted to a machine such as an engine which is to receive the clean filtered air. The base has an inlet port 56 mating with and receiving clean filtered air from axial flow opening 28, and has an outlet port 58 for supplying the air to the engine. An auxiliary port 60 may be provided between ports 56 and 58 for receiving crankcase ventilation gas for recirculation. Posts 50, 52 extend axially upwardly from base 54 within respective hollow sub-interiors 46, 48 of respective columns 42, 44 and have respective bolts 62, 64 extending axially therein. Each bolt has a lower head 66, FIG. 7, received within a bore 68 in the respective post and having a keyed configuration therein, e.g. hexagonal, preventing rotation of the bolt within the bore about axis 70. This construction is known in the prior art and is preferably that shown in U.S. Pat. No. 6,235,073, incorporated herein by reference. The upper end of each bolt is threaded as at 72 for receiving a respective wing nut 74, 76, FIGS. 2, 7 in threaded relation. Bolts 62, 64 extend upwardly through respective apertures 78, 80 in upper end cap 22. Upper end cap 22 may be provided with an upwardly protruding stud 82 for mounting a cover or shroud (not shown) on or around the filter if desired.

Lower end cap 24 is adjacent and mounted to base 54. Posts 50, 52 extend axially through respective column sub-interiors 46, 48 to upper end cap 22 and are releasably mounted thereto at respective wing nuts 74, 76 for applying axial compression force. A respective pair of seals 84, 86, FIG. 4, seal respective sub-interiors 46, 48 of respective columns 42, 44 from interior 32 of filter media 30 to block contaminant flow therebetween. The seals are located on the columns and are provided by wiper seals, to be described, to solve a problem in prior constructions which rely upon a seal between wing nuts 74, 76 or the like and the upper end cap 22 at respective apertures 78, 80. In the latter type constructions, if the seal is inadvertently broken or forgotten during servicing, dirt may enter the engine.

Figure 9:
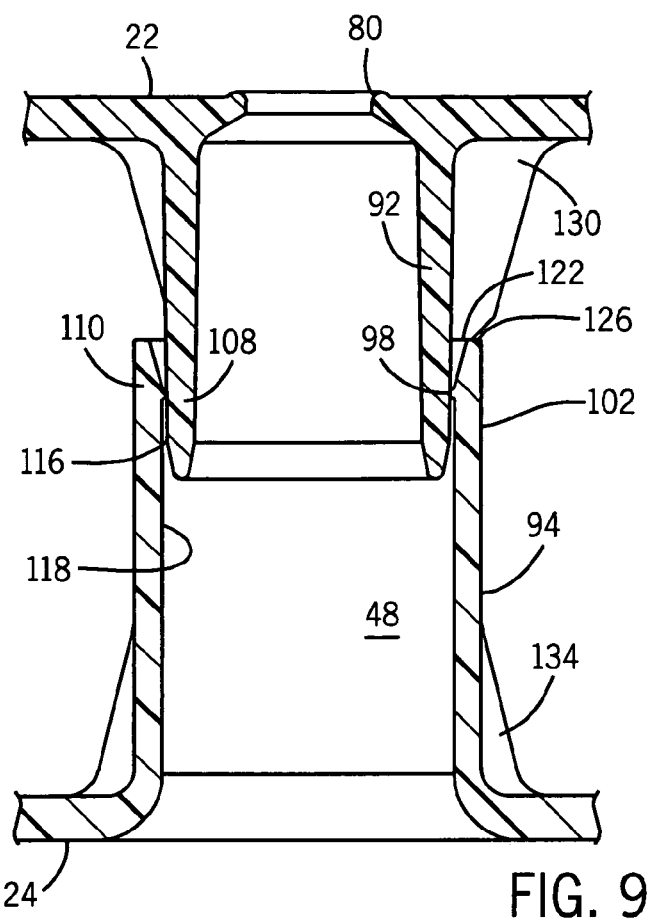
FIG. 9 is an enlarged view of a portion of FIG. 4.

Column 42 is provided by first and second sleeves 88 and 90, FIG. 4, extending respectively from end caps 22 and 24 axially towards and engaging each other in axially overlapped telescoped relation. Column 44 is provided by sleeves 92 and 94, FIGS. 4, 9, extending respectively from upper and lower end caps 22 and 24 axially towards each other and engaging each other in axially overlapped telescoped relation. One sleeve of each pair has an annular sealing bead 96, 98, respectively, engaging the other sleeve in sealing relation to seal the respective sub-interior 46, 48 of the respective column 42, 44 within the sleeves from the interior 32 of filter media 30 to block contaminant flow therebetween. Each pair of sleeves engage each other in axially overlapped telescoped relation at a respective junction 100, 102. Junction 100 has an inner sleeve portion 104, and an outer sleeve portion 106 circumscribing inner sleeve portion 104. Junction 102 has an inner sleeve portion 108, FIGS. 5, 9, and an outer sleeve portion 110 circumscribing inner sleeve portion 108. Inner sleeve portion 104 has an outer surface 112, and outer sleeve portion 106 has an inner surface 114. Inner sleeve portion 108, FIGS. 5, 9, has an outer surface 116, and outer sleeve portion 110 has an inner surface 118. Outer surface 112 of inner sleeve portion 104 faces inner surface 114 of outer sleeve portion 106 and is sealed thereto by sealing bead 96. Outer surface 116 of inner sleeve portion 108 faces inner surface 118 of outer sleeve portion 110 and is sealed thereto by sealing bead 98. Sealing beads 96, 98 are preferably on respective inner surfaces 114, 118 of respective outer sleeve portions 106, 110. End cap 22 and sleeves 88 and 92 are an integrally molded singular plastic piece. End cap 24 and sleeves 90 and 94 are an integrally molded second singular piece. Sealing beads 96, 98 are an integrally molded part of the noted second singular molded piece and provide the noted wiper seal as the respective sleeves are axially slid into engagement in overlapped telescoped relation.

Sleeves 88 and 92 have respective stops 120 and 122, FIGS. 4, 7–9, engaging the other respective sleeve 90 and 94 at respective axial end or lip 124 and 126 and stopping axial travel of the sleeves toward each other, to provide support for the noted axial compression force. The respective stops are preferably provided by radial support fins or ribs 128, 130 extending from upper end cap 22, FIG. 9, partially downwardly along respective sleeves 88, 92. Lower sleeves 90 and 94 may also have radial support fins or ribs 132 and 134 extending from lower end cap 24. O-ring 136, FIGS. 4, 8, seals lower end cap 24 at axial flow opening 28 to base 54 externally of hollow interior 32.

Figure 10:
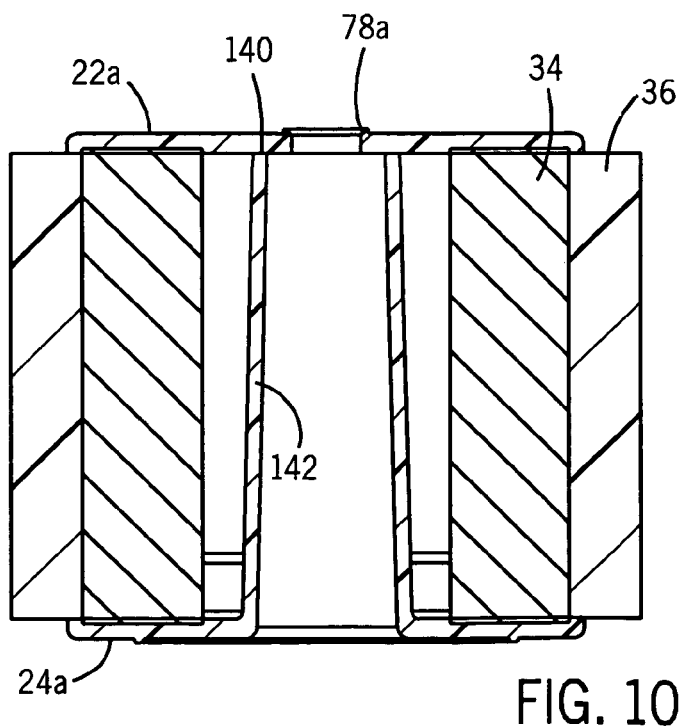
FIG. 10 is similar to FIG. 9 and shows an alternate embodiment.

In an alternate embodiment, FIG. 10, the noted wiper seal is replaced by an axial seal 140 between upper end cap 22a and a sleeve 142 extending from lower end cap 24a axially upwardly all the way to upper end cap 22a. The post such as 50 from base 54 extends upwardly within the hollow sub-interior of the column provided by sleeve 142 and through aperture 78a of the upper end cap for axial compressive mounting as above.

It is recognized that various equivalents, alternatives and modifications are possible within the scope of the appended claims.

What is claimed is:

1. A filter comprising first and second axially spaced end caps, said second end cap having an axial flow opening therethrough, filter media extending axially between said end caps and extending in a closed-loop around a perimeter defining a hollow interior communicating with said axial flow opening, wherein fluid to be filtered flows laterally through said filter media and axially through said hollow interior and said axial flow opening, a pair of columns extending axially in said hollow interior between said end caps and laterally spaced from said axial flow opening on laterally distally opposite sides thereof and in non-circumscribing relation therewith, each column having a hollow sub-interior and receiving a respective post extending axially thereinto from a base for mounting the filter to the base, the posts applying axial compression force between said end caps on laterally distally opposite sides of said axial flow opening, said columns supporting said axial compression force on laterally distally opposite sides of said axial flow opening, wherein a first of said columns comprises first and second sleeves extending respectively from said first and second end caps axially towards and engaging each other and supporting said axial compression force, and the second of said columns comprises third and fourth sleeves extending respectively from said first and second end caps axially towards and engaging each other and supporting said axial compression force, wherein said first and second sleeves engage each other in axially overlapped telescoped non-threaded axially slidable relation, one of said first and second sleeves having a first annular sealing bead engaging the other of said first and second sleeves in axially slidable sealing relation providing an axially slidable seal sealing said sub-interior of said first column within said first and second sleeves from said hollow interior of said filter media to block contaminant flow therebetween, and wherein said third and fourth sleeves engage each other in axially overlapped telescoped non-threaded axially slidable relation, one of said third and fourth sleeves having a second annular sealing bead engaging the other of said third and fourth sleeves in axially slidable sealing relation providing an axially slidable seal sealing said sub-interior of said second column within said third and fourth sleeves from said interior of said filter media to block contaminant flow therebetween, wherein said filter media has an axial height between said first and second axial ends at respective said first and second end caps, and wherein each of said first, second, third and fourth sleeves has an axial height less than said axial height of said filter media, each said post having a hollow interior, and comprising a pair of bolts, each bolt extending axially through said hollow interior of a respective said post for applying said axial compression force, the respective said sleeves, post and bolt being concentric.

2. The filter according to claim 1 wherein said one of said first and second sleeves has a first stop engaging the other of said first and second sleeves and stopping axial travel of said first and second sleeves toward each other, to provide said first column support for said axial compression force, and wherein one of said third and fourth sleeves has a second stop engaging the other of said third and fourth sleeves and stopping axial travel of said third and fourth sleeves toward each other, to provide said second column support for said axial compression force, wherein said first stop engaging said other of said first and second sleeves is spaced axially between said first and second axial ends of said filter media, and said second stop engaging said other of said third and fourth sleeves is spaced axially between said first and second axial ends of said filter media.

3. The filter according to claim 1 wherein said hollow interior of said filter media and said axial flow opening in said second end cap are in axial alignment, and wherein said posts are laterally spaced from said axial flow opening and axially non-aligned therewith and offset therefrom.

4. The filter according to claim 1 comprising a pair of seals, each provided by a respective annular sealing bead around a respective said sleeve at a respective one of said columns and sealing the respective said sub-interior of the respective said column from said interior of said filter media to block contaminant flow therebetween, a first of said seals being between said first and second sleeves, a second of said seals being between said third and fourth sleeves, wherein each of said first and second seals is laterally spaced from said axial flow opening in non-circumscribing relation, and wherein said first and second seals are laterally spaced from each other on laterally distally opposite sides of said axial flow opening.

5. The filter according to claim 1 wherein said hollow interior of said filter media and said axial flow opening in said second end cap are in axial alignment, and wherein a first of said posts is laterally spaced from said axial flow opening and axially non-aligned therewith and offset therefrom, and a second of said posts is laterally spaced from said axial flow opening and axially non-aligned therewith and offset therefrom and also laterally spaced from said first post and axially non-aligned therewith and offset therefrom.

* * * * *